United States Patent Office 3,299,189
Patented Jan. 17, 1967

3,299,189
METHYLENE ESTERS OF CARBOXYLIC AND PHOSPHORODIAMIDODITHIOIC ACIDS
Allen F. Millikan, Crystal Lake, and Gifford W. Crosby, Woodstock, Ill., assignors, by mesne assignments, to The Union Oil Company of California, Los Angeles, Calif., a corporation of California
No Drawing. Filed Apr. 19, 1962, Ser. No. 188,870
2 Claims. (Cl. 260—952)

This invention relates to a new class of chemical compounds characterized as mixed methylene esters of carboxylic and phosphorodithioic acids or phosphorodiamidodithioic acids of the formula $$(R^1R_n^2Z)(R^1R_n^3Z)P(S)S-CH_2-O\overset{O}{\overset{\|}{C}}-R$$

wherein R and $R^1$ are hydrocarbon radicals having from 1 to 25 carbon atoms and may be aliphatic, aromatic, arylaliphatic, polynuclear aromatic or cycloparaffinic in nature; Z is oxygen or nitrogen; $R^2$ and $R^3$ are hydrogen or hydrocarbon radicals, having 1–25 carbon atoms, and may be aromatic, arylaliphatic, polynuclear aromatic or cycloparaffinic in nature; and $n$ has a value of 0 when Z is oxygen and a value of 1 when Z is nitrogen.

The invention also relates to the method of making the foregoing compounds, and to their use as pesticides, ore floatation agents and anti-wear agents in oleagenous media.

There are numerous references, including the articles by Norman, Le Suer and Mastin, J. Am. Chem. Soc. 74, 161, 1952; Smalheer and Mastin, Petroleum Processing, December 1952; Pritzker, National Petroleum News, vol. 37, No. 49, December 5, 1945; Kosolapoff, "Organophosphorus Compounds," Wiley, 1950, 236; and U.S. Patents 2,432,095; 2,589,675; 2,063,269; 2,589,675, which show the step-wise production of esters of thiophosphoric acids and related compounds, involving the general steps of reaction of an alcohol with a phosphorus sulfide to form the dithioic acid, conversion of the acid to a metal salt or other derivative, and subsequent transformation of the salt to an alkyl ester. A similar sequence of steps takes place in the production of substituted amides of phosphorodithioic acids where a primary or secondary amine is used as the reactant in place of the alcohol. Certain of these methods require recrystallization of the salt, precipitation of halide complexes involved in the reaction, filtration, and other sequential steps. One reason for the conversion of the acid to the salt is that the free acid-esters or acid-amides are fairly readily attacked by oxidative-hydrolytic action of aqueous reagents on exposure to the atmosphere. In general, these reactions to form the esters may be shown to involve the following steps, using an alcohol as an example.

(1) $4ROH + P_2S_5 \rightarrow 2(RO)_2PSSH + H_2O$
(2) $(RO)_2PSSH + NaOH \rightarrow (RO)_2PSSNa + H_2O$
(3) $(RO)_2PSSNa + XR^1 \rightarrow (RO_2)PSSR^1 + NaX$ Various reactions of phosphorodithioic acids are known in the art, but no method is disclosed for the preparation of the methylene esters of carboxylic and phosphorodithioic acids. For instance, it is known to react an alkyl halide with a dithioic acid in the presence of ammonia to prepare dithioic esters wherein the alkyl halide may be substituted, as in the cases of alpha-chloroacetamide and benzyl chloride. Similarly, the known reaction of a metal salt of a dithioic acid with an acetyl chloride or substituted acetyl chloride gives a product which is a mixed anhydride of a carboxylic acid and a phosphorodithioic acid diester rather than a methylene ester of those two acids. In other methods, esters of unsaturated dicarboxylic acids are formed by adding the phosphorodithioic acid diester to the unsaturated bond of the acid forming triesters which are not methylene esters.

In still another method, a dithioic acid is reacted with an ester of an unsaturated alcohol to form compounds having fungicidal properties. Methods involving addition to unsaturated bonds cannot be used to prepare methylene esters because there must be a chain of at least two carbon atoms where there is an unsaturated bond; the products of these addition reactions may be regarded as substituted methylene esters or polymethylene esters.

Accordingly, this invention is based on the discovery of a new class of chemical compounds, the methylene esters of carboxylic and phosphorodithioic acids, which compounds are useful as pesticides, ore floatation agents, etc., and are especially useful as antiwear additives in lubricant compositions.

The methylene esters of this invention are prepared by the reaction of a halomethyl carboxylate with an O,O'-dialkyl, diaryl, or alkyl aryl phosphorodithioic acid or, alternatively, with a phosphorodiamidodithioic acid in the presence of ammonia. The general reaction is illustrated by the equation:

$$R\overset{O}{\overset{\|}{C}}-OCH_2Cl + NH_3 + (R^1R_n^2Z)(R^1R_n^2Z)P(S)SH \longrightarrow$$
$$(R^1R_n^2Z)(R^1R_n^3Z)P(S)SCH_2O\overset{O}{\overset{\|}{C}}-R + NH_4Cl$$

wherein R, $R^1$, $R^2$, $R^3$ and Z and $n$ are as previously defined.

A feature of this invention is that the esters resulting from this reaction, which is carried out following the procedure set forth in this application, although prepared in a manner similar to that of United States Patent 2,977,382, have unusual oil-solubility; semiquantitative tests indicate that the methylene ester of O,O'-diethyl phosphorodithioic acid and acetic acid is more soluble in lubricating oil compositions than the free O,O'-diethyl phosphorodithioic acid or the formylethyl (—$CH_2CH_2CHO$) ester of that acid.

Accordingly, it becomes a primary object of this invention to provide a new class of compounds, characterized as methylene esters of carboxylic and phosphorodithioic acids, having the aforestated general formula.

Another object of this invention is to provide a method for preparing methylene esters of carboxylic and phosphorodithioic acids having the aforestated general formula.

Another object of this invention is to provide a new composition of matter comprising the methylene esters of carboxylic and phosphorodithioic acids having the aforestated general formula.

Still another object of this invention is to provide lubricating oil compositions containing a small amount, sufficient to enhance the anti-wear properties, of the methylene esters of carboxylic and phosphorodithioic acids as defined both generically by formula and specifically as in the illustrative examples.

These and other objects of this invention will become apparent or be described as the specification proceeds.

The phosphorodithioic acids used as starting materials are prepared by reacting an alcohol with phosphorus pentasulfide. Alcohols suitable for this purpose include, but are not limited, to methyl alcohol, ethyl alcohol, propyl alcohol, isopropyl alcohol, butyl alcohol, isobutyl alcohol, sec-butyl alcohol, tertiary butyl alcohol, n-amyl alcohol, 2-methylbutanol, isoamyl alcohol, neopentyl alcohol, 2-pentanol, 5-methyl-2-hexanol, tert-amyl alcohol, 2-methyl-1-pentanol, 3-methyl-1-pentanol, isohexyl alcohol, 2-ethyl-1-butanol, 2,2-dimethylbutanol, 3,3-dimethylbutanol, 2,3-dimethyl-1-butanol, 3-hexanol, 3-methyl-2-pentanol, 1,3 - dimethylbutanol, 2 - methyl - 3 - pentanol, pinacolyl alcohol, 2-methyl-2-pentanol, 3-methyl-3-pentanol, 2,3 - dimethyl - 2 - butanol, n-heptyl alcohol, 2,5-dimethyl-3-pentanol, pentamethylethanol, 1-octanol, capryl alcohol, 2-ethyl-1-hexanol, lauryl alcohol, phenol, o-cresol, m-cresol, p-cresol, 3,5-xylenol, 3,4-xylenol, 1-naphthol, and 2-naphthol.

The phosphorodiamidodithioic acids used as starting materials are prepared by reacting primary or secondary amines with phosphorous pentasulfide. Useful amines include methylamines, ethylamines, aniline, m-benzylaniline, p-benzylaniline, benzylamine, propylamine, isopropylamine, dipropylamine, di-isopropylamine, butylamine, dibutylamine, isobutylamine, di-isobutylamine, pentylamine, isopentylamine, isoamylamine, p-isopropylaniline, dodecylamine, and the like. The reaction between primary or secondary amines and $P_2S_5$ results in phosphorodiamidodithioates which may be used as intermediates for preparing the subject compounds. Mixed diamides are obtained when dialkyl amines react with $P_2S_5$ at about 130° C.

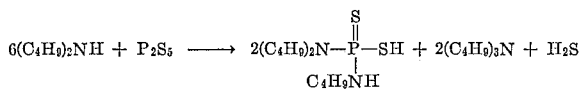

With primary amines, symmetrical diamides can be prepared. Aniline reacts with $P_2S_5$ at 30° C. to give N,N-diphenylphosphorodiamidodithioic acid:

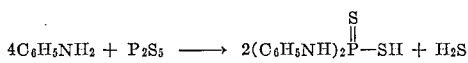

The products resulting from the reaction of the alcohol or the amine with phosphorus pentasulfide, after separation and purification, or in their semi-pure state, are reacted with an organic halomethyl carboxylate of the formula

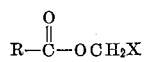

wherein R is a substituent as previously defined and X is a halogen, particularly chlorine, bromine and iodine. Fluorides may also be used but the reaction is much slower. These compounds may be prepared by several procedures, including the reaction of the corresponding acyl halide:

with an alkanal such as formaldehyde preferably in the form of paraformaldehyde in the presence of a condensation catalyst such as zinc chloride, aluminum chloride, ferric chloride, boron trifluoride and the like under anhydrous conditions. Species of halomethyl carboxylates include:

| Name | Formula |
|---|---|
| Chloromethyl acetate | $CH_3-\overset{O}{\underset{\|}{C}}-O-CH_2Cl$ |
| Bromomethyl acetate | $CH_3\overset{O}{\underset{\|}{C}}-O-CH_2Br$ |
| Iodomethyl acetate | $CH_3\overset{O}{\underset{\|}{C}}-O-CH_2I$ |

Other halomethyl carboxylates, which may be catalytically made from acyl chlorides and paraformaldehyde, include: chloromethyl valerate (B.P., 60°, 15 mm. Hg); chloromethyl o-toluate (B.P., 125°, 15 mm. Hg); chloromethyl m-toluate (B.P., 130–132°, 20 mm. Hg); chloromethyl p-toluate (B.P. 135–136°, 20 mm. Hg); chloromethyl phenylacetate (B.P., 138–140°, 15 mm. Hg).

In order to illustrate the invention, the following examples are given:

Example I

Thirty grams (1.0 mole) of paraformaldehyde, 80.0 g. (1.02 mole) of acetyl chloride, 200 ml. of toluene, and a few crystals of anhydrous zinc chloride were charged to a 3-necked flask which was equipped with a thermometer, a mercury-sealed stirrer, and a reflux condenser. After the mixture had been stirred and heated to 65° C. by means of a steam bath, the heat was removed and the reaction was permitted to proceed for 40 minutes on self-generated heat. Then, heat from the steam bath was applied again to raise the temperature to 80° C., where it was held for another 40-minute period. At the end of this period, the reaction and formation of chloromethyl acetate appeared to have gone to completion.

A 0.25-mole portion of the chloromethyl acetate was combined with about 0.25 mole of O,O'-diethyl phosphorodithioic acid and about 250 ml. of toluene in a 500 ml., 3-necked flask. Then, anhydrous ammonia was bubbled through the mixture for a period of 40 minutes, resulting in the evolution of an appreciable amount of heat and the precipitation of ammonium chloride. This precipitate was removed by filtration, leaving a two-phase liquid product. The upper phase appeared to be toluene solution of the desired product, methylene acetate-O,O'-diethyl phosphorodithioate, and the lower phase appeared to be ammonium O,O'-diethyl phosphorodithioate.

Upon further treatment, the lower phase yielded a minor amount of a white solid, acetamide, which was removed by filtration. The filter cake was washed with toluene, and the washings and liquid were combined with the toluene phase. Then the toluene solution was stripped under vacuum with nitrogen, leaving a residue of about 40 g. of a yellow liquid. This represented about 62% of the theoretical yield of methylene acetate-O,O'-diethyl phosphorodithioate. The product evolved formaldehyde when hydrolyzed with concentrated sulfuric acid and water; this is reported to be a qualitative test for methylene esters. A comparison of the determined elemental composition and the theoretical elemental analysis of methylene acetate O,O'-diethyl phosphorodithioate ($C_7H_{15}O_4PS_2$) is as follows:

| | Theoretical | Actual |
|---|---|---|
| P, Percent | 12.0 | 13.0 |
| S, Percent | 24.8 | 28.9 |
| Acid No., mg. KOH/gm | 0 | 2 |

Thus, the product was concluded to be impure methylene acetate O,O'-diethyl phosphorodithioate.

Example II

Thirty grams (1 mole) of paraformaldehyde, 94.4 g. (1.02 mole) of propionyl chloride, 200 ml. of toluene, and a few crystals of anhydrous zinc chloride are charged to a 3-necked flask which is equipped with a thermometer, a mercury-sealed stirrer, and reflux condenser. After the mixture has been stirred and heated to 65° C. by means of a steam bath, the heat is removed and the reaction is permitted to proceed for 40 minutes on self-generated heat. Then, heat from the steam bath is applied again to raise the temperature to 80° C., where it is held for another 40-minute period. At the end of this period, the reaction and formation of chloromethyl propionate will have gone to completion.

A 0.25-mole portion of the chloromethyl propionate thus prepared is combined with about 0.25 mole of O,O'-dipropyl phosphorodithioic acid and about 250 ml. of toluene in a 500 ml., 3-necked flask. Then, anhydrous ammonia is bubbled through the mixture for a period of 40 minutes, resulting in the evolution of an appreciable amount of heat and the formation of ammonium chloride precipitate. This precipitate is removed by filtration, leaving a two-phase liquid product. The upper phase is a toluene solution of the desired product, methylene propionate-O,O'-dipropyl phosphorodithioate, and the lower liquid phase as ammonium is O,O'-dipropyl phosphorodithioate.

The product prepared in Example I was found to increase the load-carrying ability of a mineral lubricating oil, and to reduce wear under light load conditions, as measured in 4-ball tests. The results of a number of experiments to establish the load-carrying ability of the products prepared in Example I are shown in the following table.

TABLE I

| Lubricant Number | 1 | 2 | 3 | 4 |
|---|---|---|---|---|
| Composition (Weight Percent): | | | | |
| Methylene ester (Example I) | 0.5 | 0.5 | | |
| MCSR neutral oil, 170 vis | 99.5 | 79.6 | 100 | 80.1 |
| MC solvent extract from 85 vis neutral | | 5.0 | | 5.0 |
| Methacrylic polymer VI improver | | 5.6 | | 5.6 |
| Basic barium petroleum sulfonate | | 9.3 | | 9.3 |
| Max. load without seizure, 1,800 r.p.m., 10 sec | 80 | 80 | 40 | 50 |
| Wear scar diameter, mm., 20 kg., 1,800 r.p.m., 5 min | 0.28 | 0.28 | 0.36 | 0.30 |
|  | 0.30 | 0.27 | 0.37 | 0.30 |
|  | 0.30 | 0.27 | 0.36 | 0.30 |

*Example III*

Chloromethyl m-toluate is prepared in the manner of Examples I and II, and a 0.25 mole portion of the chloromethyl m-toluate, 0.25 mole of N,N'-tri-n-butylphosphorodiamidodithioic acid, and 250 ml. toluene are charged to a reaction flask. Anhydrous ammonia is bubbled through the stirred reaction mixture and the mixture is heated by means of a steam bath. The reaction continues for several hours. At the end of this time, by-product ammonium chloride is filtered off, the filtrate being a toluene solution of the methylene ester of m-toluic acid and N,N'-tri-n-butylphosphorodiamidodithioic acid with a minor amount of dissolved ammonium salt of N,N' - tri-n-butylphosphorodiamidodithioic acid. The product of this experiment imparts anti-wear properties to a lubricating composition when included therein.

*Example IV*

Stoichiometric quantities of iodomethyl 2-ethylhexanoate and N,N'-diphenyldiamidodithioic acid are reacted in the presence of excess ammonia and in toluene solution in the manner of Example III. The product resulting after removal of by-product ammonium iodide by filtration is the methylene ester of 2-ethylhexanoic acid and N,N'-diphenyldiamidodithioic acid, a compound useful as an anti-wear additive in lubricating oil compositions.

In preparing the esters of this invention, any acyl halide of the formula

may be used wherein X is a halogen, including chlorine, bromine, iodine and fluorine, and R is a hydrocarbon radical having from 1 to 25 carbon atoms to include, by way of illustration, aliphatic, cycloaliphatic, aryl, alkaryl and aralkyl radicals; condensed-ring-diaryl, -triaryl and -tetraaryl radicals; such as methyl, ethyl, propyl, isopropyl, butyl, isobutyl, t-butyl, amyl, isoamyl, isohexyl, hexyl, cyclohexyl, heptyl, isoheptyl, octyl, isooctyl, nonyl, isononyl, decyl, undecyl, dodecyl, tridecyl, tetradecyl, pentadecyl, hexadecyl, heptadecyl, octadecyl, nonadecyl, eicosyl, up to pentacosyl radicals, and phenyl, benzyl, naphthyl, anthryl, phenanthryl radicals.

Examples of suitable acyl halides are: acetyl bromide, acetyl fluoride, acetyl chloride, acetyl iodide, propionyl chloride, n-butyryl chloride, isobutyryl chloride, n-valeryl chloride, isovaleryl chloride, n-caproyl chloride, capryl chloride, stearoyl chloride, and benzoyl chloride.

Illustrative species of suitable phosphorodithioic acid diesters and phosphorodiamidodithioic acids are:

O,O'-di-2-ethylhexyl phosphorodithioic acid
O,O'-diethyl phosphorodithioic acid
O,O'-dibutyl phosphorodithioic acid
O,O'-dihexyl phosphorodithioic acid
O,O'-dibenzyl phosphorodithioic acid
O,O'-diphenyl phosphorodithioic acid
O,O'-di-2-methylhexyl phosphorodithioic acid
O,O'-di(ethylphenyl) phosphorodithioic acid
O,O'-di-4-methyl-2-pentyl phosphorodithioic acid
O,O'-di-isopropyl phosphorodithioic acid
O,O'-dicresyl phosphorodithioic acid
N,N'-di-2-ethylhexyldiamidophosphorodithioic acid
N,N'-diethyldiamidophosphorodithioic acid
N,N'-di-n-butyldiamidophosphorodithioic acid
N,N'-tri-2-ethylhexylphosphorodiamidodithioic acid
N,N'-diphenylphosphorodiamidodithioic acid
N,N'-tri-n-pentylphosphorodiamidodithioic acid In carrying out the process of this invention, it is only necessary to bring together a mole-for-mole ratio of the halomethyl carboxylate and the desired ester of phosphorodithioic acid, in the presence of ammonia to act as an acceptor for the hydrogen halide released during the reaction. In one embodiment, the halomethyl carboxylate and phosphorodithioic acid are merely mixed together, and ammonia is bubbled through the reaction mixture. The reaction can be carried out at temperatures of from 20° C. to 150° C., or as high as the boiling point of the lower-boiling component, provided appropriate means, such as reflux condensers, are used to condense and return any vapors. The products are easily separated by the use of a solvent such as toluene, benzene, xylene, hexane and the like which dissolves the desired product and allows the precipitation of the resulting ammonium halide, the halide being removed by filtration, decantation or other known means.

The invention accordingly relates to compositions of matter comprising the methylene esters of carboxylic acids and phosphorodithioic acids or phosphorodiamidodithioic acids, lubricating compositions consisting of a major portion of a mineral lubricating oil and a wear-inhibiting amount of said esters and the method of preparing the esters. The method comprises reacting a phosphorodithioic acid diester or a phosphorodiamidodithioic acid with the corresponding halomethyl carboxylate in the presence of ammonia and recovering the methylene ester. The reaction is readily carried out as shown by the examples and preferably is conducted by using about 1 mol of the halomethyl carboxylate with about 1 mol of said acids at a temperature of about 20–150° C. As illustrated herein the hydrocarbon radical R can be the same as or different than the radicals $R^1$, $R^2$ and $R^3$.

The embodiments of this invention in which an exclusive property or privilege is claimed are defined as follows:

1. Methylene toluate-N,N'-tri-n-butylphosphorodiamidodithioate.
2. Methylene 2-ethylhexanoate - N,N' - diphenylphosphorodiamidodithioate.

(References on following page)

References Cited by the Examiner

UNITED STATES PATENTS

| | | | |
|---|---|---|---|
| 2,632,020 | 3/1953 | Hoeberg | 260—461 |
| 2,783,202 | 2/1957 | McDermott | 252—46.6 |
| 2,876,245 | 3/1959 | Lanham | 260—461 |
| 2,948,682 | 8/1960 | Crosby et al. | 252—46.6 |
| 2,977,382 | 3/1961 | Millikan. | |
| 3,166,581 | 1/1965 | Vegter. | |
| 3,168,436 | 2/1965 | Chupp. | |

FOREIGN PATENTS

| | | |
|---|---|---|
| 947,369 | 7/1956 | Germany. |
| 1,246,221 | 10/1960 | France. |

CHARLES B. PARKER, *Primary Examiner.*

DANIEL E. WYMAN, *Examiner.*

J. R. SEILER, D. R. PHILLIPS, *Assistant Examiners.*